No Printed Specification Available
8682X
R. Eastman,
Water Wheel,
Patented Mar. 11, 1835.
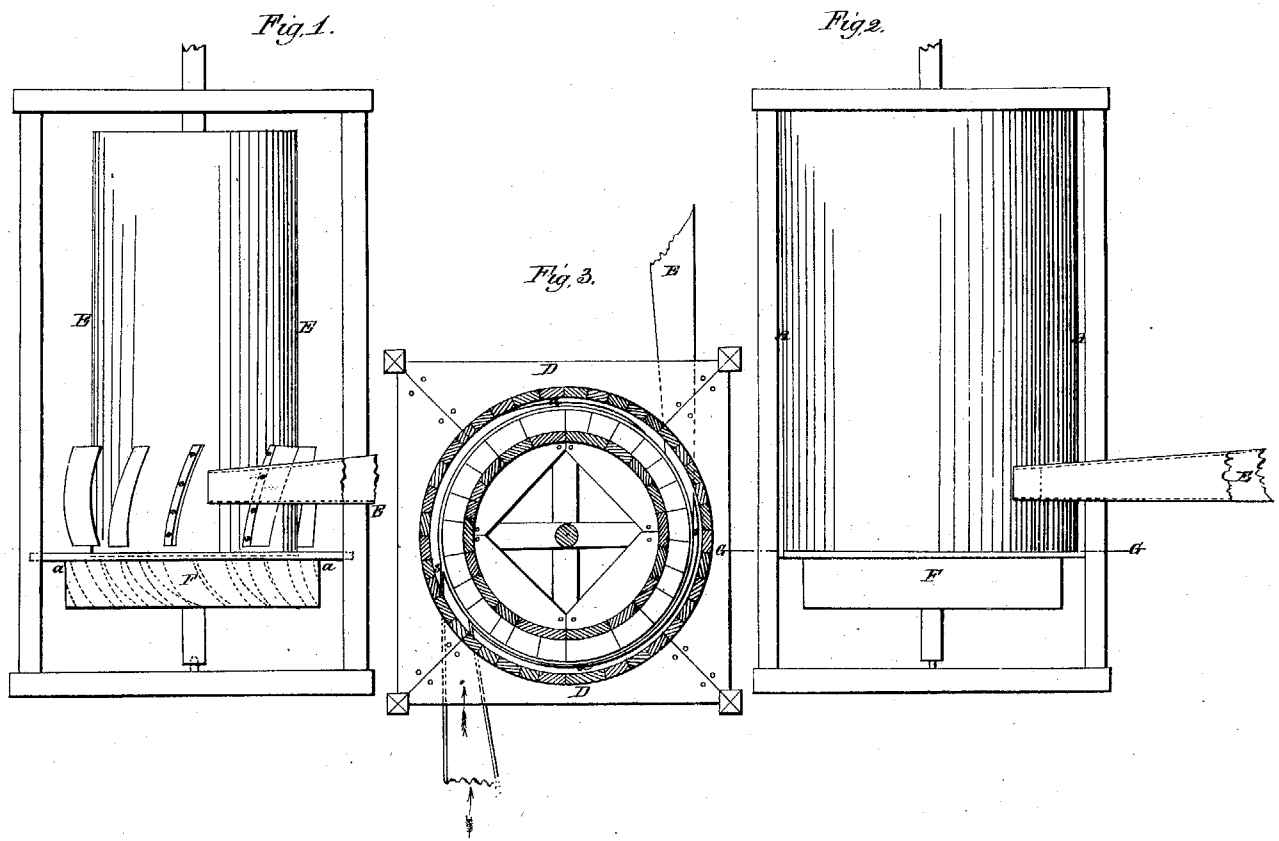
N. PETERS, PHOTO-LITHOGRAPHER, WASHINGTON, D. C.

Robert Eastman, of Concord. N. H. 8682X
Letters Patent.

The schedule referred to in these Letters Patent. and making part of the same containing a description, in the words of the said Robert Eastman, himself. of his improvement in the construction of Water Wheels.

---

To all whom it may concern; Be it known that I Robert Eastman of Concord in the County of Merrimac, and State of New Hampshire, have invented certain improvements in the contruction of the water wheel used for driving machinery by the combined action of using the water by percussion and reaction on the same wheel, which combination produces more power from the same quantity of water than has heretofore been obtained by the application of either of these methods separately - and I do hereby declare that the following is a full and exact description of my said improvement, reference being had to the drawings which accompany and make part of these significations. This wheel may be constructed of cast iron when wanted for permanent works; or for cheapness in common mills it may be made principally of wood with iron floats or buckets, and may be constructed as follows: when made of wood the shaft must have a cylinder to extend from the bottom of the shaft to the summit height of the water in the floom, where the head and fall is not very large. This cylinder for a common grist mill where there is eight or ten feet head may be about three & half feet in diameter. The bottom end of this cylinder is made conical where the reacting floats are attached so as to contract the water and bring the discharge as near the periphery of the wheel as possible. These buckets should be about six inches wide at the top, and about three or four inches at the bottom, and Twelve in depth, nearly in the form of a common tub wheel only the buckets are placed nearer together and more curving at the bottom.
On the outer edge of these floats, I place a rim of staves and secure them by iron hoops the upper ends to be turned off true to fit into the planking as shewn in the drawing at A.A, Fig. 3. These planks are secured firm on four upright posts and the circle cut to fit the part turned off so that the wheel can turn without much friction. Directly above the reacting floats I place the percussion floats as shewn in the drawing, these may be fewer in number and about twenty inches deep and six wide

8682X bolted firm in the cylinder. I then surround the wheel with a cylinder or curving that rest on plank D.D. and extending to the top of the cylinder on the wheel, and large enough to clear the outer edges of the percussion floats two or three inches. A curving is made inside of the stationary cylinder from one spout to the other as shewn at S.S. in the drawing to drive the water against the percussion floats more uniformly. I then apply the water by a conductor as shewn in the drawing which should extend as near the floats as can without touching them. When the water is thus applied it partakes of a rotary motion and acts on all the floats at the same time and being confined by the outer cylinder rises to nearly the summit height of the water in the floom, and the head thus cased in the cylinder acts on the bottom floats by its gravity and produces a reacting power as it leaves the wheel and the action of one part does not appear to retard the action of the other. and by this combining the several powers on one wheel a much greater power is obtained from the same water than has heretofore been derived - and the cylinder prevents the back water from affecting the percussion floats so that it will operate in back water as well as any reacting wheel - where the wheel wants to be extended for large works it may be made much larger in diameter and more spouts added.

What I claim as my invention and for which I ask a patent is, the combined arrangements in the above described water wheel, I also claim any other form in which they may be put to produce the same result.

Witnesses
Jonathan Eastman Jr.
Sarah E. Eastman

Robert Eastman (Drawing)

Exd.
M.G.